E. JANIK.
REGISTERING DEVICE OF CASH REGISTERS.
APPLICATION FILED OCT. 24, 1910.

1,059,162.

Patented Apr. 15, 1913.

6 SHEETS—SHEET 1.

Inventor
Edouard Janik

Witnesses
By Mauro, Cameron, Lewis & Massie
Attorneys

E. JANIK.
REGISTERING DEVICE OF CASH REGISTERS.
APPLICATION FILED OCT. 24, 1910.

1,059,162.

Patented Apr. 15, 1913.
6 SHEETS—SHEET 2.

E. JANIK.
REGISTERING DEVICE OF CASH REGISTERS.
APPLICATION FILED OCT. 24, 1910.
1,059,162.
Patented Apr. 15, 1913.
6 SHEETS—SHEET 3.
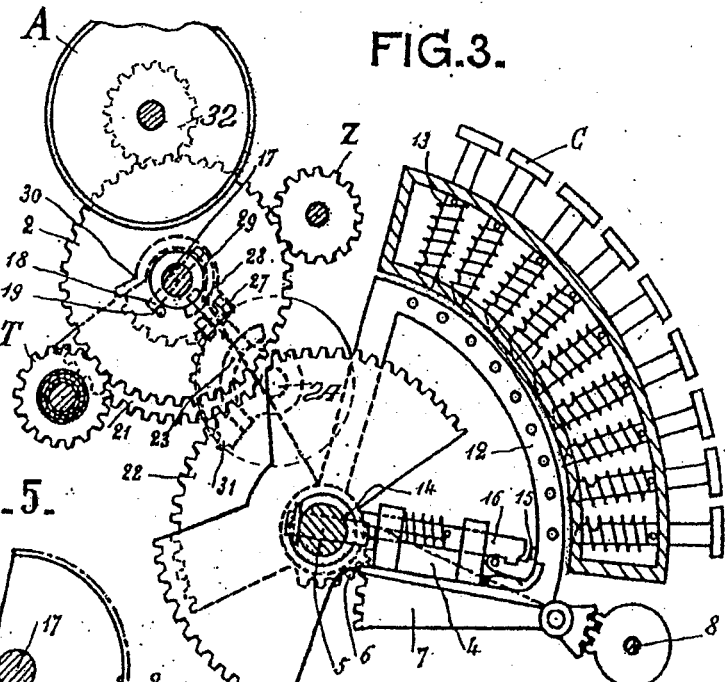
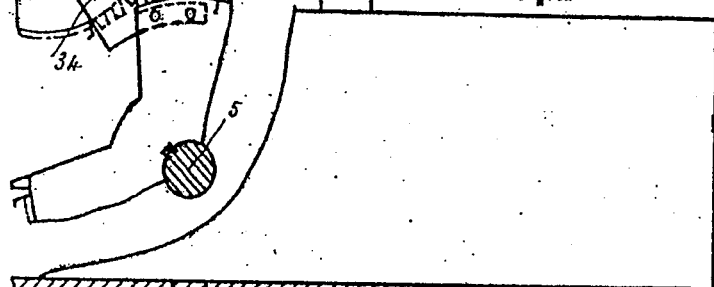
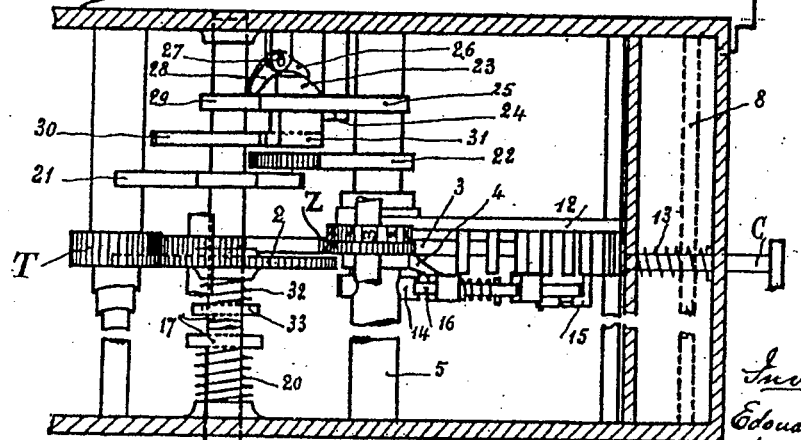

E. JANIK.
REGISTERING DEVICE OF CASH REGISTERS.
APPLICATION FILED OCT. 24, 1910.

1,059,162.

Patented Apr. 15, 1913.
6 SHEETS—SHEET 4.

E. JANIK.
REGISTERING DEVICE OF CASH REGISTERS.
APPLICATION FILED OCT. 24, 1910.
1,059,162.
Patented Apr. 15, 1913.
6 SHEETS—SHEET 5.
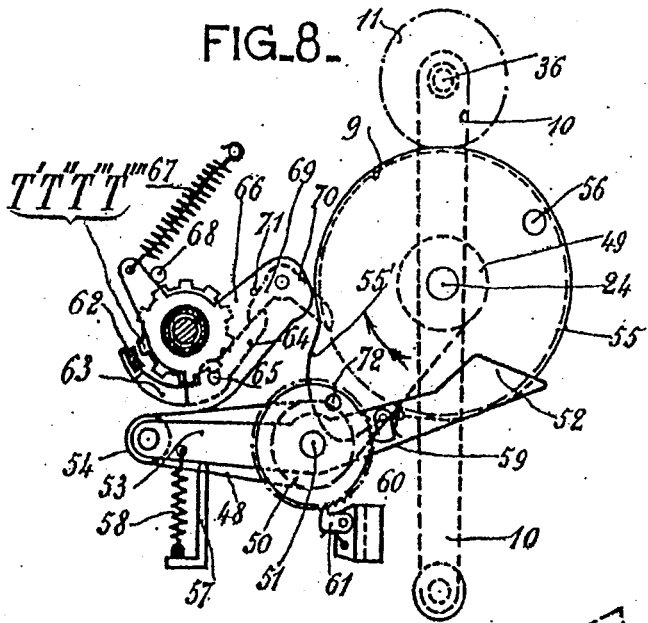
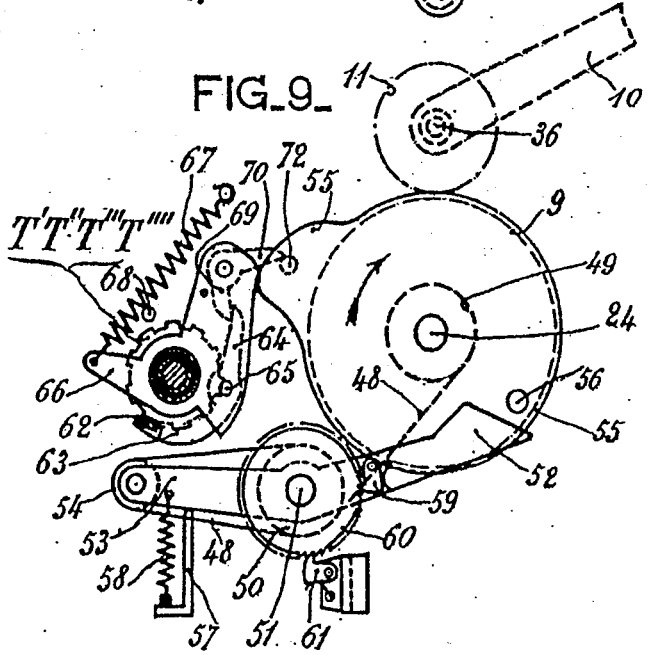

E. JANIK.
REGISTERING DEVICE OF CASH REGISTERS.
APPLICATION FILED OCT. 24, 1910.
1,059,162.
Patented Apr. 15, 1913.
9 SHEETS—SHEET 6.
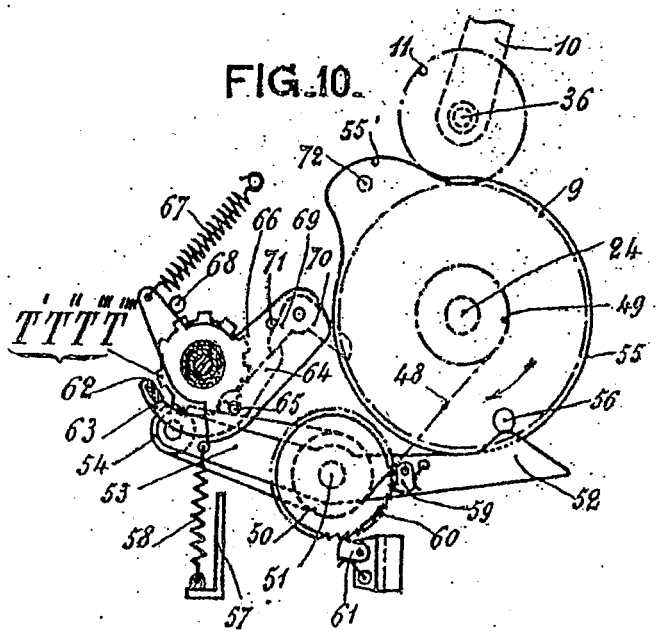
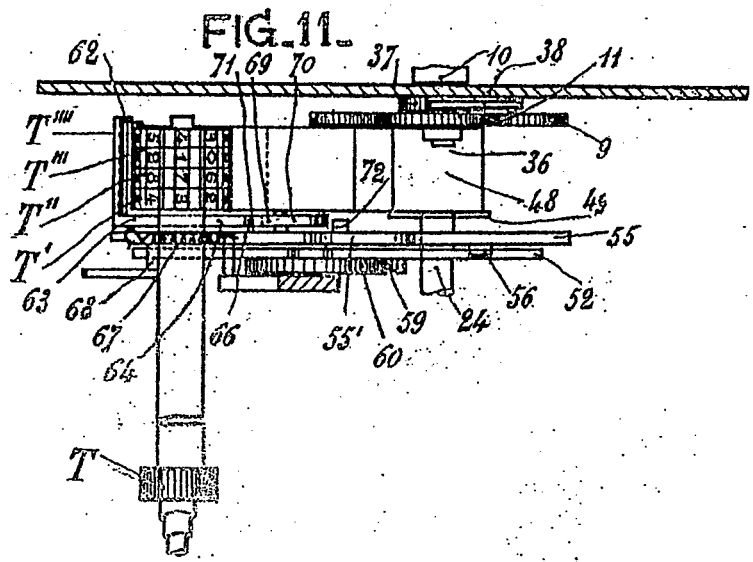

UNITED STATES PATENT OFFICE.

EDOUARD JANIK, OF PARIS, FRANCE, ASSIGNOR TO SOCIÉTÉ GÉNÉRALE FRANÇAISE DES CAISSES PAYEUSES ET DE CONTRÔLE SYSTEME JANIK, OF PARIS, FRANCE.

REGISTERING DEVICE OF CASH-REGISTERS.

1,059,162. Specification of Letters Patent. Patented Apr. 15, 1913.

Application filed October 24, 1910. Serial No. 588,882.

*To all whom it may concern:*

Be it known that I, EDOUARD JANIK, a subject of the Emperor of Austria-Hungary, residing at Paris, France, have invented new and useful Improvements in the Registering Devices of Cash-Registers, of which the following is a specification.

This invention relates to improvements in the registering devices of cash registers; these improvements apply more particularly to cash registers in which the corresponding indicating type and counting wheels are brought into their position by a common driving wheel. These improvements relate to the common adjustment of the indicating wheels, the type wheels and the counting wheels according to the amount indicated by the keys, to the backward turning movement of the indicating wheel and the type wheel into the zero position, to the arrest of the actuating mechanism at the end of each operation, and to the printing mechanism.

The annexed drawings show one embodiment of the invention.

Figure 1:
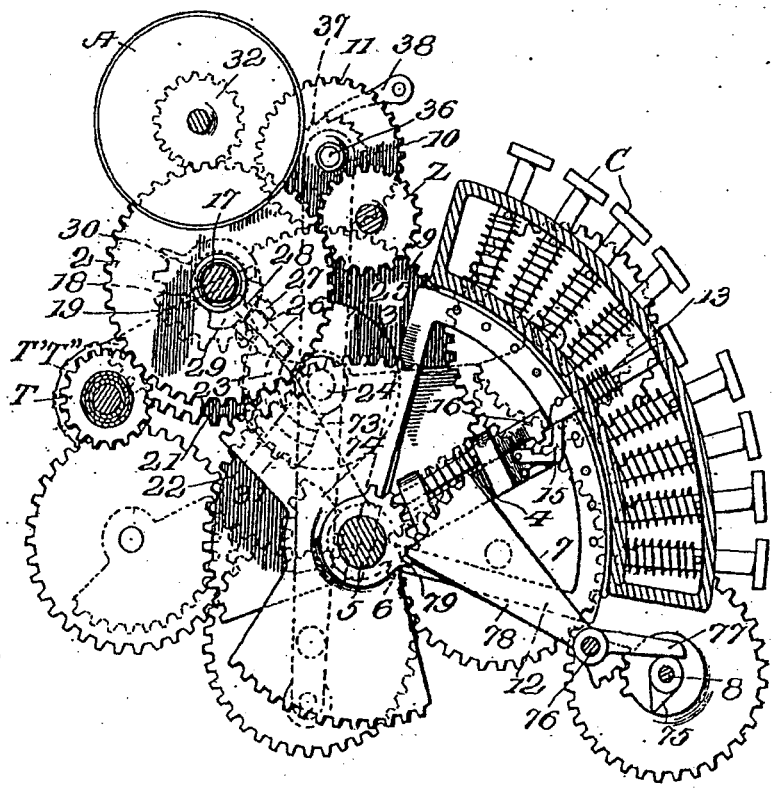
Figure 2:
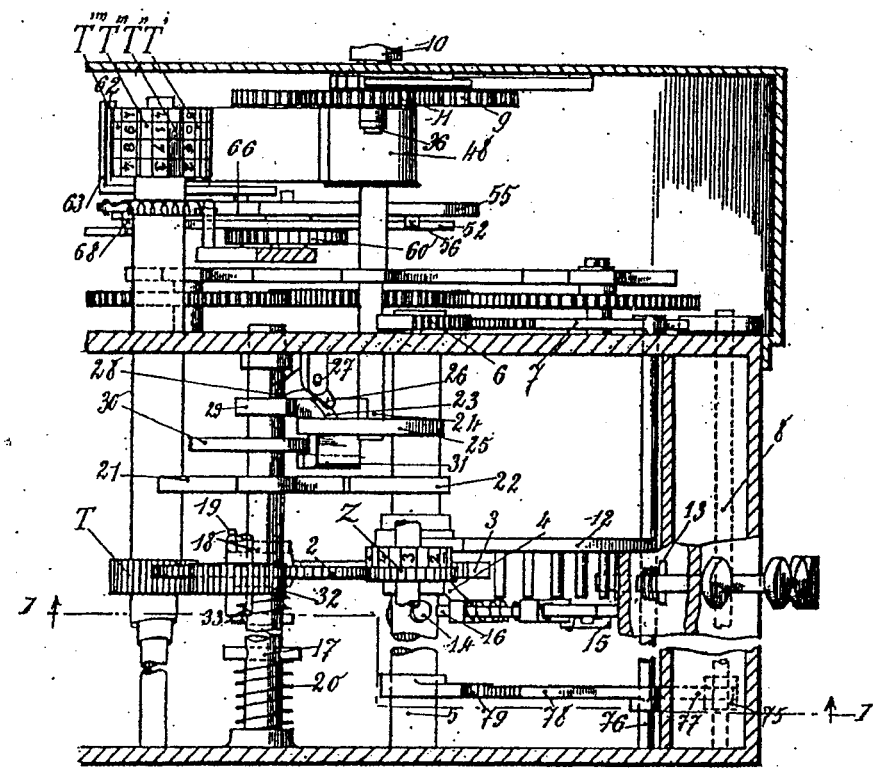
Figure 6:
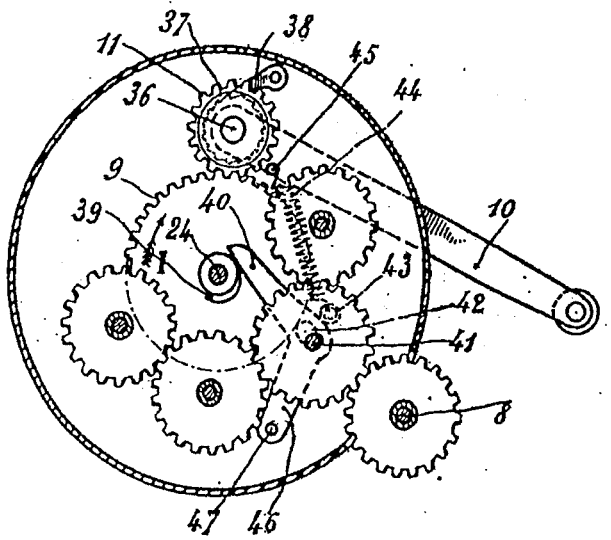
Figure 7:
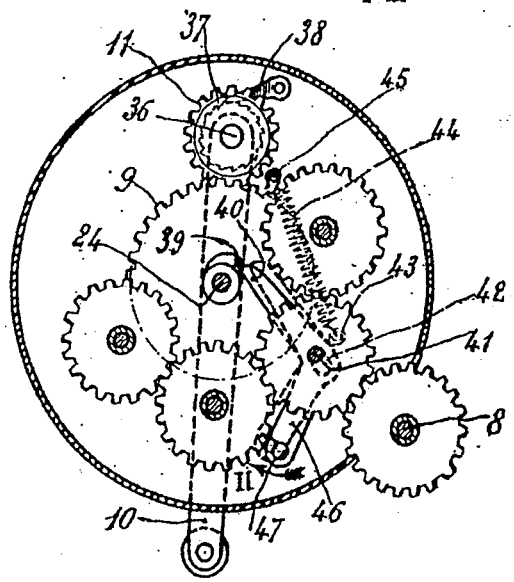

Figures 1 and 2 show diagrammatically in elevation and in plan the whole of the apparatus in one position, and Figs. 3 and 4 show diagrammatically in elevation and in plan the principal parts of the apparatus in other positions. Fig. 5 shows diagrammatically a detail. Figs. 6 and 7 show the actuating mechanism of a cash register with the arresting device in end view in two different positions. The improved printing device is shown diagrammatically in end view in different positions in Figs. 8, 9 and 10. Fig. 11 is a plan partly in section through the casing of the device.

As shown, each of the indicating wheels A is provided with a corresponding type wheel T, and a counting wheel Z having a common driving pinion 2; each of the pinions 2, for the purpose of adjustment is adapted to engage in a toothed sector 3. The shaft 5, Figs. 1 and 2, receives in known manner its forward movement through toothed sectors 73 and 74, from the shaft 24 of the main pinion 9, and its backward movement to the initial position through toothed sectors 6, 7 from the shaft 8. This shaft 8 through the cam 75, (Fig. 1) acts on an arm 77 of the toothed sector 78 adapted to rotate on the shaft 76, and receives its movement in both directions from the main driving pinion 9 by means of a transmission by pinions. Rotation of the pinion 9 is effected for example, by means of the handle 10 and of the pinion 11 keyed on the axis of the handle. Backward movement of the handle 10 is prevented by a stop wheel 37 mounted on the shaft 36 of the handle and in which engages a pawl 38, Figs. 6 and 7. The arresting device which prevents the main driving wheel from making more than a complete rotation at each operation is, according to the present invention, constituted as follows:—

To the pinion 9 is secured a tooth 39 which coöperates with a pawl or detent 40. The pawl 40 may turn about its axis and is longitudinally movable on the shaft 41 by a transmission wheel owing to the fact that the pawl has a slot 42 in which the shaft 41 engages. To a short arm 43 on one side of the locking pawl is attached a spring 44, one end of which is secured to a fixed pin 45. The spring 44 consequently presses the pawl 40 against the periphery of the hub of the pinion 9 having the arresting tooth 39, and further brings it to its highest position. On the other side the pawl is provided with an arm 46 having a journal 47 extending outward and serving as a handle.

At the end of the operation of the handle or crank, during which operation the pinion 9 is turned in the direction of the arrow I, the stop 39 on the hub of the wheel or pinion causes the pawl 40 on the shaft 41 to turn backward as far as the slot 42 permits. The pawl thereafter prevents any further rotation of the pinion 9 and consequently of the crank 10.

In order to turn the crank again it is sufficient to move the pawl 40 by means of the journal or handle 47 in the direction of the arrow II, Fig. 7, so that the locking pawl 40 is disengaged from the stop 39, and as it is immediately acted upon by the spring 44 by which it is drawn upward it follows that after release of the journal or handle 47 the pawl cannot again come in front of the stop before the new operation of the crank is finished.

The control of the amount to be registered is effected in known manner by depression of the keys C, (Figs. 1 and 2) the lower ends of which engage pins on a locking sector 12 which pins retain them, against the action of their springs 13, in the lowest position. In this position the lower end of each key forms an abutment for a locking lever 4. This is carried by a pin 14 on the controlling shaft 5 until, on account of the contact of the pawl 15 with the abutment 16 pressed against the action of a spring into operative position, this abutment will be released and moves to the pin 14. The movement of the regulating lever 4 by the shaft 5 consequently ceases, and in addition, the movement of the lever 4 is still more exactly limited by the striking of the lever itself against the lower end of the key C. The corresponding driving pinion 2 has thus received a rotation of proportional amount from the toothed arc 3 and this is transmitted to the indicating wheel A, to the type wheel T and to the counting wheel Z, so that these wheels are adjusted according to the value of the depressed keys.

For the indicating and type wheels the regulation continues until the next operation of the till. It is only on the next operation that they turn back into zero position for the next adjustment. The calculating wheels, however, do not take part in the backward rotation of the type and indicating wheels to zero position and further, they must be released immediately after adjustment for the necessary carrying of tens. Thus, while the type and indicating wheels may constantly remain in engagement with the driving pinion 2, the counting wheel must be disengaged after the adjustment and it is only after the disengagement of the counting wheels that the coupling of the shaft of the driving pinion with the adjusting device at the rear can be effected.

In the example given, the driving pinions 2 are mounted loose on their shaft 17. For backward movement of the pinions 2, the shaft 17 is provided with pins 18 which act on lateral projections 19 on the pinions. In order to disengage the counting wheels and to couple the shaft 17 with the device for imparting a backward turning movement, the shaft 17 is mounted so as to be able to move longitudinally. A spring 20 (Figs. 2 and 4) constantly tending to prevent this longitudinal displacement normally holds the shaft 17 in the position corresponding to the adjustment of the registering device (Figs. 1 and 2). In this position the driving pinions 2 are engaged not only by the pinions of the type and indicating wheels but also by the pinions of the counting wheels and the toothed sectors (Fig. 2). In order that on movement of the shaft 17, which is automatically effected in the manner hereinafter described, the driving pinions 2 may remain in gear with the pinions of the type and indicating wheels, the teeth of these pinions are made of a suitable width (Figs. 2 and 4).

While the shaft 17 is in its regulating position, a toothed sector 21 fixed on the shaft 17 is engaged with another arc 22 keyed on the shaft 5. Consequently the shaft 17 receives, through the adjusting shaft 5 a rotation in the direction of adjustment in agreement with the complete movement of the adjusting shaft 5, so that the pins 18 turn farther than the projections or abutments 19 on the driving pinions 2, when the driving pinions themselves corresponding to the key moved, only undergo a part of their complete rotation.

At the end of the adjustment, an elevating cam 23 on an elevating disk 25 mounted on the shaft 24 of the main driving pinion 9, acts on the arm 26 of a double-armed lever 26—28 adapted to turn about a fixed pivot 27; the arm 28 of this lever bears on the shaft 17, behind an abutment in the form of an arc or collar 29. By movement of the lever 26—28 (Figs. 2 and 4) by means of the cam 23 the shaft 17 receives its longitudinal movement against the action of the spring 20. The driving pinions 2 are then disengaged from their toothed arcs and toothed pinions of the calculating wheels Z; further, the toothed sector 21 is disengaged from the toothed sector 22 (Fig. 4).

At the commencement of the next operation, a toothed sector 30 keyed on the shaft 17 gears with a toothed sector 31, Fig. 4 formed integral with the elevating disk 25 on the shaft 24 of the main driving pinion 9. By means of this sector or arc, at the commencement of the following operation, backward movement of the shaft 17 and, consequently, of the driving pinions 2 through the pins 18, is effected so that the indicating wheels A and the type wheels $T^i$, $T^{ii}$, $T^{iii}$, $T^{iiii}$ are returned to zero position before the new calculation. The exact position of engagement of the toothed sectors 30 and 31 is produced by each adjusting movement of the shaft 17. After adjustment of the shaft 17, the toothed sector 30 occupies, relatively to the toothed sector 31 the position indicated in Fig. 4; in this position the teeth of the two arcs, for commencing the backward movement of rotation, are located one in front of the other, ready to be engaged.

Excessive rotation of the driving pinions is avoided by the adjustment of the levers 4, since these limit the rotation of the pinions 2. Each driving pinion is provided on the upper side with a braking attachment comprising a brake spring 32 arranged on the shaft 17 at the side of the pinion and acting on its hub or its face (Figs. 2 and 4); this spring holds the pinions 2, as soon as the toothed arcs or sectors 3 are disengaged from the pinions 2. The spring 32 bears at the other end against a collar or pin 33 on the shaft 17. By replacing the collar or pin 33 by an adjusting ring the tension of the spring 32 may be made adjustable.

For further insuring, in an exact manner, the engagement of the driving pinions 2 with their toothed arcs or sectors 3, a stop 34 is provided on each toothed arc 3, this stop serving as an abutment for a lateral projection or stud 35 located on the wheel or pinion 2, in the zero position of this latter (Fig. 5).

The type wheels $T^1$, $T^{ii}$, $T^{iii}$, $T^{iiii}$ forming the set of type wheels are secured in known manner on different shafts arranged concentrically on the same axis and which are adjusted in the manner above described according to the amount to be registered. The recording ribbon 48 is unrolled from a rotary drum 49 and is automatically rolled up at the other end on a drum 50. About the axis 51 of this drum 50 oscillates a two-armed lever 52, 53 which carries the guiding and striking roller 54 for the ribbon 48. The ribbon is led over this roller before passing over the roller 50. The arm 52 of the lever 52, 53 is controlled by a stud 56 provided on a cam disk 55 connected with the main driving pinion 9; this bolt or stud during the rotation of the disk 55 in the direction of the arrow (Fig. 10) strikes against the lever 52—53 and against the action of a spring 58 moves down its other arm 53 against a fixed casing 57. In this movement of the lever 52, 53 effected by the cam disk 55 a spring controlled pawl 59 arranged on the arm 52 slides on the periphery of a ratchet wheel 60 connected to the ribbon operating drum 50 which wheel is prevented from moving therewith by a counter-pawl 61. During the backward movement of the lever 52, 53, by means of the spring 58, the pawl 59 moves the wheel 60 the number of teeth traveled at the commencement thereby so that the recording ribbon will have advanced one step.

Acording to the present invention and in order to obtain constantly a good impression of the line of type set each time, each line of type is inked immediately before its impression. To this end the inking pad 62 is placed on the arm 63 of a two-armed lever 63—64 the pivot 65 of which is secured to a support 66 adapted to turn freely on the shafts of the type wheels. This support 66 is constantly pressed against a fixed abutment 68 (Fig. 11) by means of a spring 67. In this position of the support 66 the pad 62 is beyond the path of the ribbon roller 54.

In order that before each stroke of the ribbon, and after the adjustment of the line to be printed, the inking pad 62 may strike on this line and in front of this line, the support 66 has imparted to it against the action of the spring 67, a corresponding rotary movement by means of the cam disk 55; the free end of the support 66 is, to this end, pressed against the periphery of the disk 55, by means of the spring 67. Rotation of the support 66 is effected at the proper moment by means of the cam $55^1$, on the disk 55. While the outer part of the cam $55^1$ which is concentric relatively to the axis of the disk, holds the support 66 in the operative position of the pad 62, this is caused to strike the line of adjusted types. This is effected by means of a bell crank lever 69, 70 secured to the support 66 and adapted to turn; the arm 69 extends over the arm 64 of the striking lever of the pad; it is limited in its rotation in a direction opposed to the operative movement by means of a stop 71 fixed on the support 66. The arm 70 of the bell crank lever 69—70 comes into the path of a pin or stud 72 provided on the disk 55, which stud is arranged in such manner that it determines the operative movement of the bell crank lever 69—70 when the support 66 has brought the pad into operative position (Fig. 9); consequently in this position, the dropping of the pad on the line of type is assured.

The line of type, set or adjusted each time, is located in front of the striking cylinder or roller 54 of the recording ribbon 48 (Fig. 8). Once the adjustment of the type wheels is effected, the cam $55^1$ comes into operation on the support 66 and causes it to turn with the pad 62 into its operative position (Fig. 9), in which then by means of the shoulder 72 on the disk 55, the bell crank lever 69—70 is immediately set in motion; in this manner the stroke of the pad on the adjusted line is effected. Then, the shoulder 72 releases the bell crank lever 69—70, this also again releases the pad and allows it to fall again and the support 66 slides along the cam $55^1$; the spring 67 may thus bring it back to its inoperative position (Figs. 10 and 11). Then, the pin 56 on the disk 55 acts on the arm 52 of the lever 52—53 for operating the recording ribbon 48 and causes the stroke of the ribbon for the impression (Fig. 10). The pawl 59 serving to advance the ribbon has been displaced in advance, in the manner described, on the periphery of the wheel 60, so that the advance of the recording ribbon is effected during the rearward movement of the lever 52—53, by the action of the spring 58, after the release of the arm by the pin 56.

The commencement of all the necessary movements of the printing device is thus entirely determined by a single disk.

Having described my invention, what I claim and desire to secure by Letters Patent of the United States is:—

1. In a device of the character described, the combination of indicating wheels, type wheels, counting wheels mounted on shafts, common driving pinions for operating said wheels, a driving shaft on which said driving pinions run loosely in one direction, a second shaft parallel thereto, members automatically connecting said last mentioned shafts, pins on said driving shaft adapted to operate said pinions on movement in the other direction, and means for displacing said driving pinions longitudinally of said driving shaft.

2. In a device of the character described, the combination of indicating wheels, type wheels, counting wheels mounted on shafts, common driving pinions for operating said wheels, a driving shaft on which said pinions run loosely in one direction, a second shaft parallel thereto, members automatically connecting said last mentioned shafts, pins on said driving shaft adapted to operate said pinions on movement in the other direction, means for displacing said driving pinions longitudinally of said driving shaft, and brake devices for limiting the movement of said pinions.

3. In a device of the character described, the combination of indicating wheels, type wheels, counting wheels mounted on shafts, common driving pinions for operating said wheels, a driving shaft on which said pinions run loosely in one direction, a second shaft parallel thereto, members automatically connecting said last mentioned shafts, pins on said driving shaft adapted to operate said pinions on movement in the other direction, means for displacing said driving pinions longitudinally of said driving shaft, brake devices for limiting the movement of said pinions, toothed sectors arranged on said last mentioned shafts, and arresting devices arranged on said toothed sectors.

4. In a device of the character described, the combination of indicating wheels, type wheels, counting wheels mounted on shafts, common driving pinions for operating said wheels, a driving shaft on which said pinions run loosely in one direction, a second shaft parallel thereto, members automatically connecting said last mentioned shafts, pins on said driving shaft adapted to operate said pinions on movement in the other direction, means for displacing said driving pinions longitudinally of said driving shaft, brake devices for limiting the movement of said pinions, toothed sectors arranged on said last mentioned shafts, arresting devices arranged on said toothed sectors, an arresting stop provided on each of said driving pinions, a pawl adapted to engage therewith, and a spring adapted to press said pawl into engagement with said stop.

In testimony whereof I have signed my name to this specification in the presence of two subscribing witnesses.

EDOUARD JANIK.

Witnesses:
  DOUMI CASALONGA,
  H. C. COXE.